US005274844A

United States Patent [19]

Harrison et al.

[11] Patent Number: 5,274,844

[45] Date of Patent: Dec. 28, 1993

[54] BEAM PATTERN EQUALIZATION METHOD FOR AN ADAPTIVE ARRAY

[75] Inventors: R. Mark Harrison, Grapevine; Mark Van Horn, Arlington, both of Tex.

[73] Assignee: Motorola, Inc., Schaumburg, Ill.

[21] Appl. No.: 880,781

[22] Filed: May 11, 1992

[51] Int. Cl.[5] .......... H04B 07/14

[52] U.S. Cl. .......... 455/25; 455/129; 455/33.3; 455/276.1; 342/368; 342/378

[58] Field of Search .......... 455/33.3, 121, 123, 455/129, 54.1, 13.3, 25, 63, 65, 276.1; 342/368, 378, 383, 384

[56] References Cited

U.S. PATENT DOCUMENTS

| | | | |
|---|---|---|---|
| 4,575,724 | 3/1986 | Wiener | 342/383 |
| 4,754,282 | 6/1988 | Edelblute et al. | 342/378 |
| 5,099,254 | 3/1992 | Tsukii et al. | 342/368 |

*Primary Examiner*—Reinhard J. Eisenzopf

*Assistant Examiner*—Philip J. Sobutka

*Attorney, Agent, or Firm*—Jon P. Christensen

[57] ABSTRACT

A method is offered of automatically beamforming a radio frequency transmitter having an array antenna. The beamformed signal is transmitted for the benefit of a target communication unit based upon characteristics of a received signal. The method includes the steps of determining a transmit equalizer transfer function and receive equalizer transfer function for each array element of the antenna array based, at least in part, upon application of common input signals and comparison of outputs. The method further includes adaptively filtering a received signal, from a communication unit based, at least in part, upon the determined receive equalizer weights, to provide a receive beamform array. A beamformed signal may then be transmitted to the communication unit based upon the transmit equalizer weights and receive beamform array.

17 Claims, 2 Drawing Sheets

BEAM PATTERN EQUALIZATION METHOD FOR AN ADAPTIVE ARRAY

FIELD OF THE INVENTION

The field of the invention relates to beam forming of radio frequency signals and more specifically to adaptive beam forming of radio frequency signals.

BACKGROUND OF THE INVENTION

Beamformers are known. Such devices may be used to direct radio frequency (RF) energy (emissions) to a specific target at a specific location. Such directed RF emissions ("transmit beamforming") may be accomplished through the use of directional antenna(s) or through the use of antenna arrays. Where antenna arrays have been used the characteristics of the RF emissions may be influenced by array element positioning or by a mathematical weighting of outputs from array elements.

While the process of transmit beamforming may not be difficult, the location to which an RF emission is to be directed may not be readily identifiable. Where the source is a radar transponder, the solution is simplified in that the operator simply selects the direction of transmission and waits for a response. Where, on the other hand, the target is a mobile communication unit then the situation may be considerably more difficult. Transmit beamforming relative to mobile communication units is typically based upon some type of locational feedback from the target.

Methodologies of maximizing a receive signal ("receive beamformers") are also known. Receive beamformers typically receive a signal from an antenna and, through a process of mathematical analysis (or select a set of receive characteristics, maximizing receive signal quality. Where the antenna is a directional antenna the antenna may simply sweep an arc (containing the target) seeking the point of maximum signal strength from a desired target.

Antenna arrays may also be configured as receive beamformers through adjustments to physical positioning of array elements, or through adaptive filtering. Changing the positioning of array elements, on the other hand, may lead to unexpected results and loss of signal integrity. Adjustments to positioning of array elements also interferes with reception of RF signals from outside a selected beam area.

In general, where signals must be simultaneously received from large numbers of geographically dispersed communication units, physical positioning of antenna element is not practical. Where physical positioning of antenna elements is not practical, receive beamforming may be performed through mathematical analysis of signals received through a multitude of antenna elements.

Where receive beamforming is performed through mathematical analysis, the beamformer may exist in a mathematical sense only and may be considered a subset of adaptive filtering (see Adaptive Filter Theory, 2nd ed., Simon Haykin, Prentice Hall, 1991). The receive beamformer, in such case, may be considered as a form of spatial filter attenuating all but selected signals. Since a set of input signals from an antenna array may be received and stored, any number of receive beamformers may operate upon a given set of stored data to produce any number of signals from stored input data.

A cellular radiotelephone system is an example of a situation where receive beamforming may be performed through adaptive filtering (adaptive beamforming). Adaptive beamforming in such a system is typically performed at a base site which includes an antenna array and through which a number of simultaneous communication transactions may occur.

Adaptive beamforming, in general, may be performed through calculation of a set of antenna array weights. The set of antenna array weights minimizing interference may be calculated using measurements from the array when both a known desired signal and interferers are present. The set of weights may then be used to cancel interference during periods when the desired signal is not known, provided that the location of the sources of interference and the desired signal remain substantially constant. The weights which minimize the interference may be calculated by solving the complex equation as follows:

$$Xw=y$$

The value, X, is a N×M matrix of array (signal) (simultaneously sampled array outputs), where N is the number of snapshots, and M is the number of antenna elements.

$$\bar{X} = \begin{matrix} x_0(0) & x_1(0) & \dots & x_{M-1}(0) \\ x_0(1) & x_1(1) & \dots & x_{M-1}(1) \\ \cdot & \cdot & \dots & \cdot \\ \cdot & \cdot & \dots & \cdot \\ \cdot & \cdot & \dots & \cdot \\ x_0(N-1) & x_1(N-1) & \dots & x_{M-1}(N-1) \end{matrix}$$

The value, y, is the N×1 vector of the (known) desired signal.

$$y = \begin{matrix} y(0) \\ y(1) \\ \cdot \\ \cdot \\ \cdot \\ y(N-1) \end{matrix}$$

The value w is an adaptive array weight vector (M×1) for all array elements.

$$w = \begin{matrix} w_0 \\ w_1 \\ \cdot \\ \cdot \\ \cdot \\ w_{M-1} \end{matrix}$$

Given the weight vector, w, the adaptive output of the beamformer may be computed at any time, t:

$$y(t) = \sum_{k=0}^{M-1} w_k x_k(t)$$

While receive beamformers have worked well, an antenna array is typically required as a prerequisite for receive beamforming. Portable communication units (because of size and weight limitations) are typically not equipped with antenna arrays.

An alternative to receive beamforming (at a portable) is transmit beamforming at a base site. Transmit beamforming at a base site may allow significant signal energy to be directed to the location of a portable without significantly interfering with reception by another portable.

Transmit beamforming, on the other hand, has proved difficult (in practice) because of the difficulty of determining transmit beamform array coefficients. Part of the difficulty of determining transmit coefficients lies in the fact that the coefficients of a receive beamform array used in beamforming a received signal have very little relationship to the coefficients of beamforming a transmitted signal. Phase differences and non-linearities in receive and transmit elements make receive beamform arrays inapplicable to beamforming a transmitted signal. Because of the importance of mobile communications a need exists for a simpler method of beamforming transmitted signals from base sites to portable communication units.

SUMMARY OF THE INVENTION

A method is offered of automatically beamforming a radio frequency transmitter having an array antenna. The method includes the steps of determining a transmit equalizer transfer function and receive equalizer transfer function for each array element of the antenna array at least in part, upon application of common input signals and comparison of outputs. The method further includes adaptively beamforming a received signal, from a communication unit based, at least in part, upon the determined receive equalizer weights, to provide a receive beamform array. A beamformed signal may then be transmitted to the communication unit based upon the transmit equalizer weights and receive beamform array.

DETAILED DESCRIPTION OF THE PREFERRED EMBODIMENT

The solution to the problem of beamforming a transmitted signal from a base site to a mobile communication unit lies, conceptually, in the development of substantially identical transfer functions for transmit and receive antenna array elements and using a receive beamform array, calculated for a received signal, for transmit beamforming a transmitted signal. Substantially identical transfer functions between transmit and receive array elements may be developed by self-calibration and by calibration of array elements against reference signals.

Figure 1:
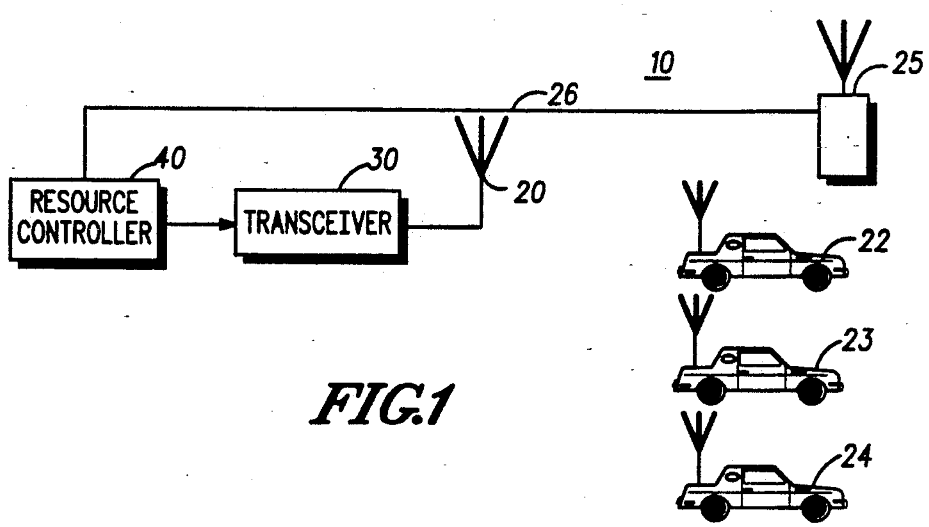
FIG. 1 depicts a communication system, in accordance with the invention.

Shown in FIG. 1 is a communication system, generally, (10) in accordance with the invention. Included within such a system (10) is a resource controller (40), transceiver (30), and communication units (22, 23, and 24). The transceiver (30) exchanges communicated signals with communication units (22–24) through an antenna array depicted in FIG. 1 as a single antenna (20).

Also included in FIG. 1 is a remote transceiver (25). The remote transceiver (25), in accordance with the invention, is interconnected with the resource controller (40) through use of a data bus (26) (e.g. a "T1" line) for exchange test signals with transceiver 30. (It should be emphasized that the transmitter and receiver of the transceiver (25) must be co-located.)

Figure 2:
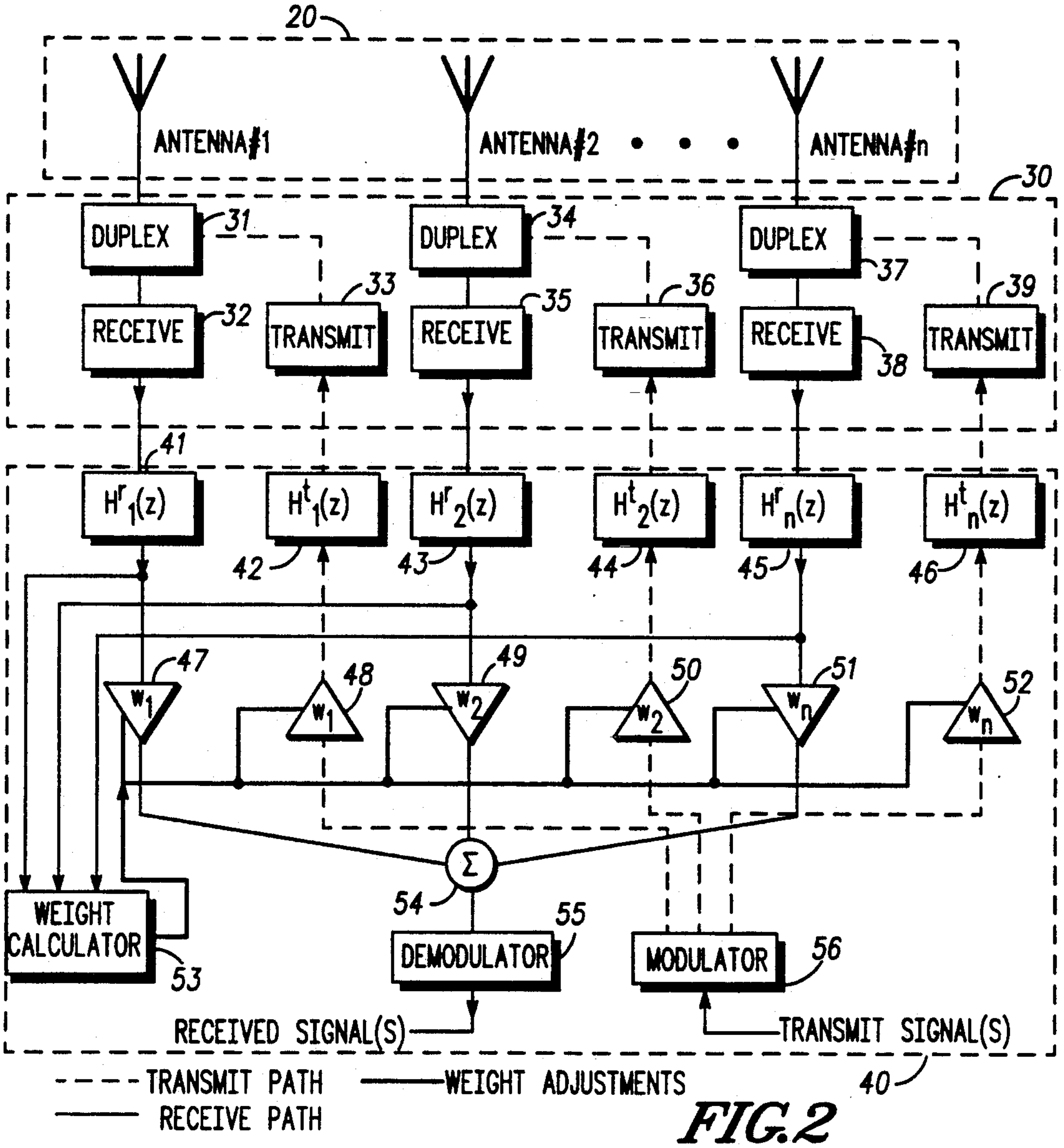
FIG. 2 comprises a block diagram of an apparatus for beamforming a signal, in accordance with the invention.

Shown in FIG. 2 is an expanded block diagram of the system (10), including transmit beamforming apparatus in accordance with the invention. As shown (FIG. 2) the antenna array (20, FIG. 1) includes antennas #1-N. As shown each antenna (#1-N) (FIG. 2) has an associated duplex switch (31, 34, or 37), transmitter (33, 36, or 39), and receiver (32, 35, or 38).

Figure 4:
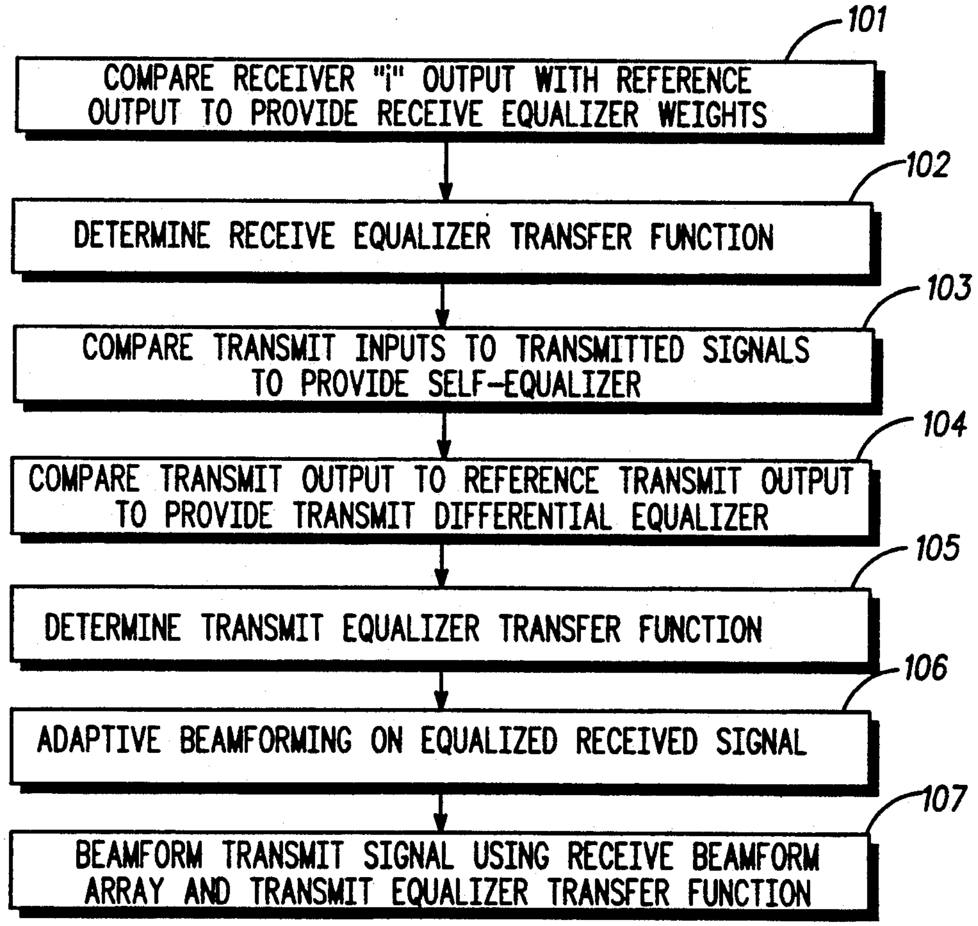
FIG. 4 depicts a flow chart of transmit beamforming, in accordance with the invention.

Turning now to FIG. 4 a flow chart of transmit beamforming under the invention is shown. Reference will be made to the flow chart (FIG. 4) as appropriate in understanding the invention.

Each receiver (32, 35, 38) has a receive equalizer ($H^r_i(z)$) (41, 43, and 45) and a weighting factor ($w^r_i$) (47, 49, and 51) through which a received signal passes. A summer (54) provides a summation of weighted input signals from the elements of the antenna array (20). The output of the summer (54) is, in turn, applied to a demodulator (55) for decoding of the received signal.

Transmitters (33, 36, and 39), likewise, receive an input signal through a modulator (56), weighting factor (48, 50, or 52), and equalizer (42, 44, or 46). The values of the weighting factors for transmit and receive, in accordance with the invention, are complex conjugates (e.g. $w^r_1(47)=w^t_1{}^*(48)$, etc).

Transmit and receive equalizers ($H^r_1(z)$ and $H^t_1(z)$, or $H^r_2(z)$ and $H^t_2(z)$, to $H^r_N(z)$ and $H^t_N(z)$) provide transfer functions which allow for a complex conjugate relationship of transmit and receive characteristics among corresponding transmit and receive elements ($w^r_i$ and $w^t_i$) of the antenna array (20). A receive beamform array ($w^r_1$-$w^r_N$) developed in response to a received signal, in accordance with the invention, is then conjugated to form a transmit beamform array ($w^t_1$-$w^t_N$).

The order p receive equalizer weights ($H^r_1(z)$, $H^r_2(z)$ . . . $H^r_N(z)$) are computed by modeling the response needed to force the ith receiver output to match the output of a reference receiver (e.g. #1 receiver) as an all-zero frequency transfer function. The input to the antenna array (20) for calculating receive equalizer weights is the remote transceiver (25, FIG. 1) located at a distance from the array (20). Receive equalizer transfer functions ($H^r_1(z)$, $H^r_2(z)$, to $H^r_N(z)$) are calculated by solving the vector equation as follows:

$$Y_i\nu_i = y1$$

where $Y_i$ is the M×p (M rows, p columns) matrix of outputs, where yi(t) indicates the output of the ith element at time t, of antenna#i:

$$Y_i = \begin{matrix} y_i(0) & y_i(-1) & \cdots & y_i(-p+1) \\ y_i(1) & y_i(1) & \cdots & y_i(-p+2) \\ \cdot & \cdot & \cdots & \cdot \\ \cdot & \cdot & \cdots & \cdot \\ \cdot & \cdot & \cdots & \cdot \\ y_i(M-1) & y_i(M-2) & \cdots & y_i(M-p+1) \end{matrix}$$

y1 is the M×1 vector of outputs of the reference antenna #1:

$$y1=y1(0)y1(1)\ldots y1(M-1),$$

and $v_i$ is the equalizer weight vector (p×1) for the ith antenna:

$$v_i=v_i(0)v_i(1)\ldots v_i(o-1)$$

The equation ($Y_i v_i = y1$) may then be solved (101) by a signal processor (not shown) within the resource controller (40) for $v_i$ using an appropriate least squares method. Given the weight vectors $v_i$, the equalizer transfer functions are given as follows (for all array elements):

$$H^{ri}(z)=\sum_{k=0}^{p-1} v_i(k)\, z^{-k}$$

The transmit equalizer transfer functions ($H^t{}_1(z)$, $H^t{}_2(z)\ldots H^t{}_N(z)$) are computed using a two-step process. In the first step, of the two-step process, a self-equalizer weight is calculated (103). In the second step, a differential equalizer weight is determined (104) based upon the previously calculated self-equalizer weights.

In each step of the two-step process a transmit array element equalizer value is computed by modeling the response needed. In the case of the self-equalizer, a value is calculated to normalize the ith transmitter output to match the input of the ith element. In the case of the differential equalizer a value is calculated to force the output of the ith transmitter to match the output of a reference transmitting element (e.g. element #1).

The self-equalizer weight vector ($c_i$) is calculated by reference to a signal received at the remote transceiver (26) upon application of a set of known, distinct (linearly indendent) input signals to the antenna array (20). The received signal at the remote (r) is a linear combination of the transmitted signals and may be expressed using M transmitted samples for each of the N transmitters and order L models of the transmitters. The self-equalizer weight vector ($c_i$) may then be determined by solving the equation as follows:

$$Xc=r$$

where X is the M×NL matrix of inputs to all elements of the array (e.g. $X=X_1X_2\ldots X_N$) and, $$X_i=\begin{bmatrix} x_i(0) & x_i(-1) & \cdots & x_i(-L+1) \\ x_i(1) & x_i(1) & \cdots & x_i(-L+2) \\ \cdot & \cdot & \cdots & \cdot \\ \cdot & \cdot & \cdots & \cdot \\ \cdot & \cdot & \cdots & \cdot \\ x_i(M-1) & x_i(M-2) & \cdots & x_i(M-L+1) \end{bmatrix}$$

r is the M×1 vector of outputs of the remote receiver:

$$r=r(0)r(1)\ldots r(M-1),\text{ and}$$

c is the equalizer weight vector (NL×1) for all array elements:

$$c=c_i(0)c_i(1)\ldots c_i(L-1)$$

the equation ($Xc=r$) may be solved (103) using an appropriate least squares method. (Note that since X is known, much of the computation needed to find c can be performed once, in advance.) In order for the transmitter outputs to be identical, the inverse of the models of the transmitters could be used. The equalizer transfer functions would therefore be all-pole of order L−1 as follows:

$$H^{t1}{}_i(z)=\frac{1}{\sum_{k=0}^{L-1} c_i(k) z^{-k}}$$

However the transfer function ($H^{t1}{}_i(z)$) is not necessarily stable in that there is no guarantee that the all-zero transmitter models are minimum phase (all zeros are not necessarily within the unit circle). The models are also likely to be less efficient than differential equalizers, since the self-equalizers do not exploit the similarities of outputs between transmitters under conditions of a common input signal.

Figure 3:
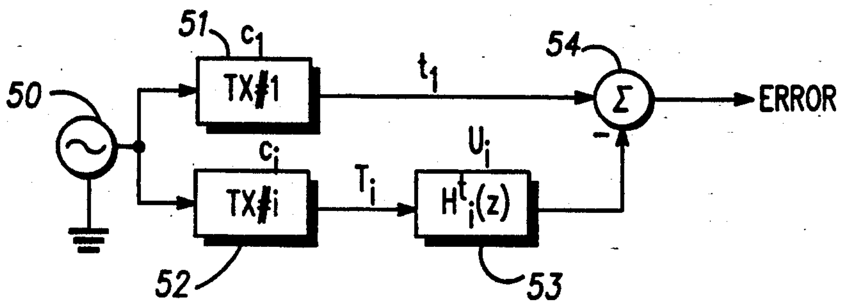
FIG. 3 is a schematic representation of signal flow for calculating transmit differential equalizer weights in accordance with the invention.

Given the transmitter model weights, $c_i$, differential equalizers can be calculated (104) by simulating the outputs of each transmitter and matching the output of each element to the reference element. Such a process can be depicted in block diagram form by reference to FIG. 3.

The simulated generator (50) produces a wideband signal, such as a pseudo noise sequence, which is filtered by both the reference transmit self equalizer transfer function (51) and by the transmit self equalizer transfer function of array element i (52). Once an output is computed (105) the same method can be used as with the receive differential equalizer weights. In this case, the equation to be solved has the form:

$$T_i u_i = t_1$$

Again, the simulated reference output can be expressed in matrix form as follows:

$$T_i=\begin{bmatrix} t_i(0) & t_i(-1) & \cdots & t_i(-q+1) \\ t_i(1) & t_i(1) & \cdots & t_i(-q+2) \\ \cdot & \cdot & \cdots & \cdot \\ \cdot & \cdot & \cdots & \cdot \\ \cdot & \cdot & \cdots & \cdot \\ t_i(M-1) & t_i(M-2) & \cdots & t_i(M-q+1) \end{bmatrix}$$

where $t_1$ is the M×1 vector of outputs of the simulated reference transmitter #1:

$$t_1=t_1(0)t_i(1)\ldots t_1(M-1),\text{ and}$$

$v_i$ is the equalizer weight vector (q×1) for the ith antenna:

$$u_i=u_i(0)u_i(1)\ldots u_i(q-1)$$

The equation ($T_i u_i = t_1$), as above, may be solved by an appropriate least squares method. The equalizer transfer functions would therefore be all-pole of order q−1 and determined (105) as follows:

$$H^{ti}(z)=\sum_{k=0}^{q-1} u_i(k) z^{-k}$$

The beneficial affect of calculating the receive transfer function ($H^{r}_{i}(z)$) and the transmit transfer function ($H^{t}_{i}(z)$) lies in the ability of a base site to beamform a transmit signal to a mobile communication unit (22–24) based upon the receive transfer function ($H^{r}_{i}(z)$), the transmit transfer function ($H^{t}_{i}(z)$), and receive beamform coefficients.

In accordance with the invention a receive equalizer transfer function and transmit equalizer transfer function for the system (10) is calculated as described above. A communication unit (22) then begins transmitting a signal to the antenna array (10). A receive beamform array is calculated using the receive equalizer transfer function. A transmit beamformed signal may then be beneficially returned to the communication unit using the transmit equalizer transfer function and complex conjugate of the receive beamform array.

In another embodiment of the invention the transmit equalizer transfer functions ($H^{t}_{1}(z)$, $H^{t}_{2}(z)$ . . . $H^{t}_{N}(z)$) are calculated using a single step process. Under such a process the transmit equalizer transfer functions ($H^{t}_{1}(z)$, $H^{t}_{2}(z)$ . . . $H^{t}_{N}(z)$) are calculated using either self equalizer values, or, differential equalizer values. A transmit beamformed signal may then be created as above.

In another embodiment of the invention the receive transfer function ($H^{r}_{1}(z)$, $H^{r}_{2}(z)$ . . . $H^{r}_{N}(z)$) is calculated by reference to a known signal transmitted by the remote (25). Under the embodiment the transfer function ($H^{r}_{1}(z)$, $H^{r}_{2}(z)$. . . $H^{r}_{N}(z)$) is computed by modeling the response needed to force the ith receiver output to match the known input to the remote transceiver (25).

We claim:

1. A method of automatically beamforming a radio frequency transmitter having an array antenna, such method including the steps of: determining a transmit equalizer transfer function and receive equalizer transfer function for each array element of the antenna array based, at least in part, upon application of common input signals and comparison of outputs; adaptively beamforming an equalized, received signal from a communication unit based, at least in part, upon the determined receive equalizer transfer function to provide a receive beamform array; and, transmitting a beamformed signal to the communication unit based upon the transmit equalizer transfer function and receive beamform array.

2. The method as in claim 1 wherein the step of determining a receive equalizer transfer function further includes the step of receiving a reference signal, from a remote transceiver, by a receive array element of the antenna array and reference array element of the antenna array and comparing an output of the receive array element and reference array element to produce a receive equalizer weight vector for the receive array element.

3. The method as in claim 2 further including the step of solving for the receive equalizer transfer function using an appropriate least squares method.

4. The method as in claim 1 wherein the step of determining a transmit equalizer transfer function further includes the step of applying a reference signal to a transmit array and comparing an output of the transmit array with the input to provide an initial transmit equalizer transfer function for the transmit array element of the antenna array.

5. The method as in claim 4 wherein the step of comparing an output of the transmit array with an input further includes receiving the output of the transmit array at a remote receiver.

6. The method as in claim 4 further includes the step of applying a reference transmit signal to an input of a transmit array element and a reference transmit array element, comparing an output of the transmit array element, using the initial transmit equalizer weight factor, and reference element, and computing a transmit transfer function producing substantial identity of output between the transmit array element and reference transmit array element for the array element of the antenna array.

7. A method of automatically beamforming a radio frequency transmitter having an array antenna, such method including the steps of: comparing an output of an at least first receive array element with a known signal from a remote transmitter to produce an at least first receive element equalizer transfer function; determining an at least first transmit equalizer transfer function, in part, by comparing an output of the at least first transmit array element with a known input signal to the at least first transmit array element; adaptive beamforming a received signal, using the at least first receive equalizer transfer function, to provide a beamforming array; and, beamforming a transmitted signal using a complex conjugate of the beamforming array, and at least first transmit equalizer weight.

8. The method as in claim 7 wherein the step of producing an at least first receive element equalizer transfer function further includes the step of transmitting the known signal from the remote transmitter to the at least one receive array element of the array antenna.

9. A method of automatically beamforming a radio frequency transmitter having an array antenna, such method including the steps of: comparing an output of an at least first receive array element with an output of a reference receive array element to produce an at least first receive element equalizer transfer function; determining an at least first transmit equalizer transfer function, in part, by comparing an output of the at least first transmit array element with a known input to the at least first transmit array element; adaptive beamforming a received signal, using the at least first receive equalizer transfer function, to provide a beamforming array; and, beamforming a transmitted signal using a complex conjugate of the beamforming array, and at least first transmit equalizer weight.

10. The method as in claim 9 wherein the step of producing an at least first receive element equalizer transfer function further includes transmitting a known signal to the an at least first receive array element and reference receive array element.

11. A method of automatically beamforming a radio frequency transmitter having an array antenna, such method including the steps of: comparing an output of an at least first receive array element with an output of a reference receive array element to produce an at least first receive element equalizer transfer function; determining an at least first transmit equalizer transfer function, in part, by comparing an output of the at least first transmit array element with a reference transmit array element; adaptive beamforming a received signal, using the at least first receive equalizer transfer function, to provide a beamforming array; and, beamforming a transmitted signal using a complex conjugate of the beamforming array, and at least first transmit equalizer weight.

12. The method as in claim 11 wherein the step of producing an at least first receive element equalizer transfer function further includes transmitting a known signal to the an at least first receive array element and reference receive array element.

13. The method as in claim 11 wherein the step of determining an at least first transmit equalizer transfer function further includes the step of receiving the outputs from the at least first transmit array element and reference transmit array element by a remote receiver and communicating such outputs to a signal processor.

14. In a radio frequency communication system using an antenna array, a method of beamforming a transmitted signal, such method comprising the steps of: computing a differential equalizer transfer function for each receive element of the antenna array; determining a self equalizer transfer function for each transmit element of the antenna array; computing a differential equalizer transfer function for each transmit element of the antenna array from corresponding elements self equalizer transfer functions; determining a receive beamforming array based, at least in part, upon the computed, receive differential equalizer transfer functions for each receive element of the antenna array; and, beamforming a transmitted signal using the complex conjugate of the receive beamforming array, and computed transmit differential equalizer transfer functions for each transmit element of the antenna array.

15. The method as in claim 14 wherein the step of computing a differential equalizer transfer function for each receive element of the antenna array further includes the step of comparing an output of an at least one receive array element with a reference element.

16. The method as in claim 15 further including the step of transmitting a known signal to the at least one receive array element and reference element from a remote transmitter.

17. In a radio frequency communication system using an antenna array, a method of beamforming a transmitted and received signal, such method comprising the steps of: computing a receive equalizer transfer function for each receive element of the antenna array producing an all-zero transfer function, upon comparison of an output of a receive element with an output of a reference element, upon application of a common input signal; determining a transmit equalizer transfer function for each transmit element of the antenna array producing an all-zero transfer function upon comparison of an output and input of a transmit array element; computing a transmit equalizer transfer function for each transmit array element of the antenna array producing an all-zero transfer function upon comparison of an output of the transmit element with an output of a reference transmit element, upon application of a common input signal; determining an adaptive array providing a beamformed receive signal based, at least in part, upon the computed equalizer transfer function for each receive element of the antenna array; and, beamforming a transmit signal using the adaptive array, and determined equalizer transfer function for each transmit element of the antenna array.

* * * * *